United States Patent [19]

Astarloa

[11] 4,097,136
[45] Jun. 27, 1978

[54] PROJECTOR FOR VISUAL IMAGES

[75] Inventor: Jose Manuel Alonso Astarloa, Bilbao, Spain

[73] Assignee: Iberastron, S.L., Bilbao, Spain

[21] Appl. No.: 734,697

[22] Filed: Oct. 21, 1976

[51] Int. Cl.² .............. G03B 21/22; G03B 27/52; H01R 9/00

[52] U.S. Cl. ............. 353/71; 339/21 R; 353/79; 355/63

[58] Field of Search ............ 355/62, 63, 72; 339/20, 339/21 R; 353/71, 79, DIG. 5, DIG. 6

[56] References Cited

U.S. PATENT DOCUMENTS

| | | | |
|---|---|---|---|
| 2,501,469 | 3/1950 | Korzminsky | 355/62 |
| 2,977,566 | 3/1961 | Neumann et al. | 339/20 |
| 3,227,039 | 1/1966 | Simmon | 355/62 |
| 3,880,511 | 4/1975 | Astarloa | 353/79 |
| 3,989,373 | 11/1976 | Craig | 355/63 |

*Primary Examiner*—Steven L. Stephan
*Attorney, Agent, or Firm*—Blum, Moscovitz, Friedman & Kaplan

[57] ABSTRACT

A projector for visual images which may be used for projection upon its own base or a wall. The projector has a base, an upstanding column, an adjustable arm and a projection housing. The projector is battery powered and the batteries are connected to the projection lamp through contacts disposed on the base and in the vertical column. The projector is operable at any column height setting.

4 Claims, 25 Drawing Figures

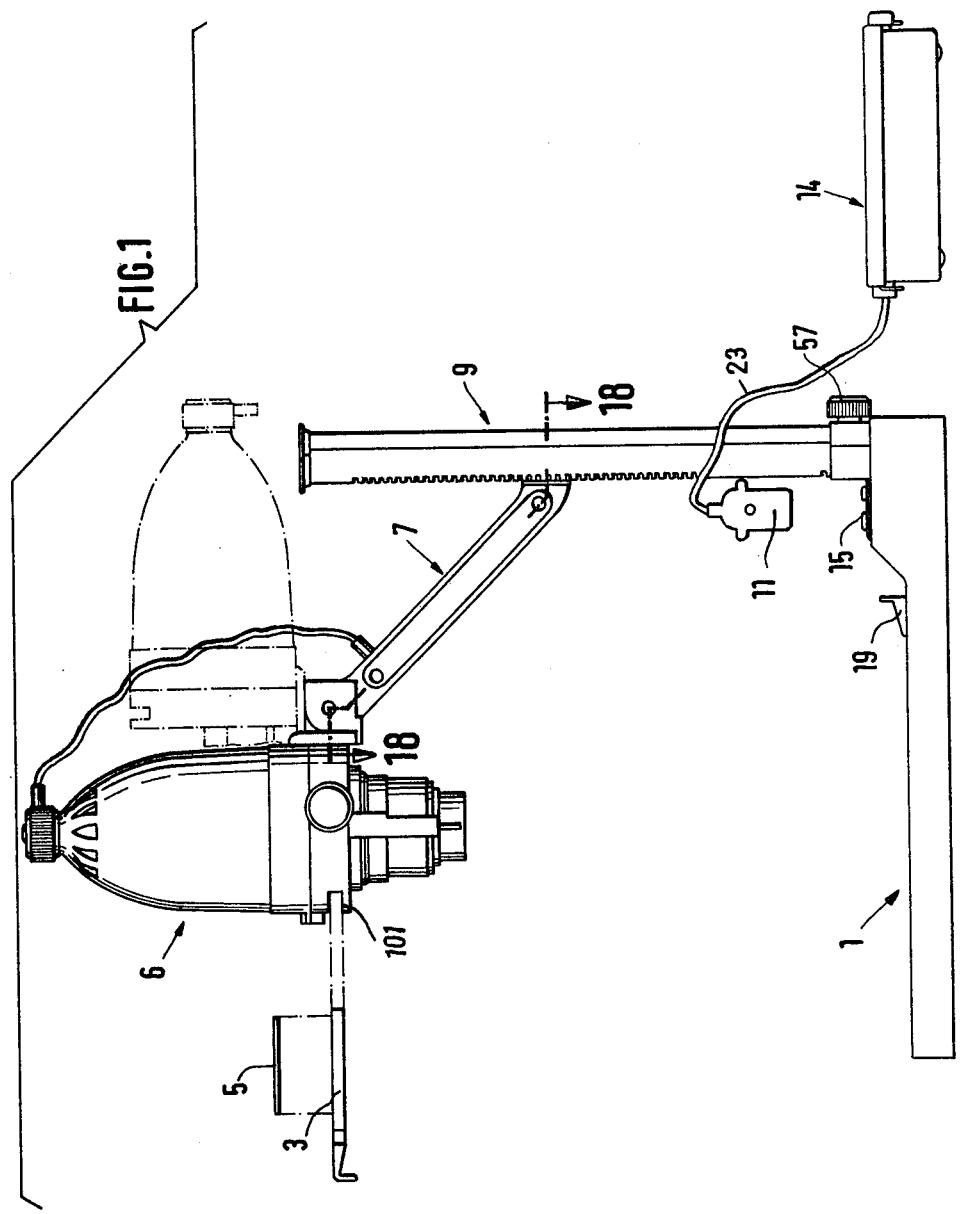

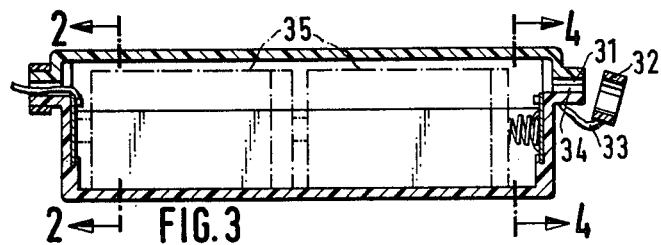
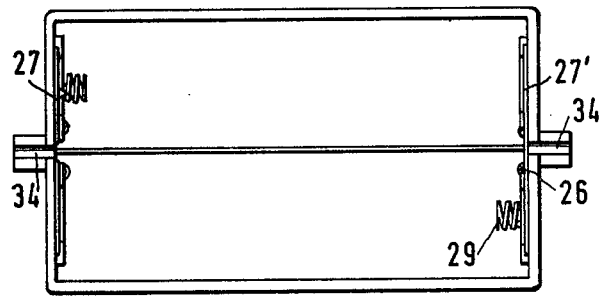
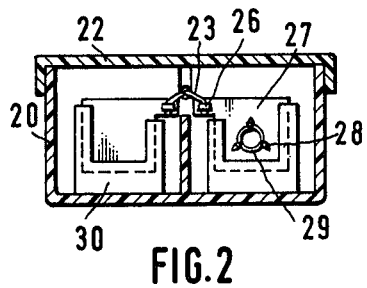
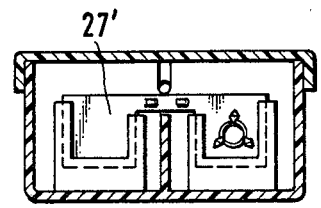
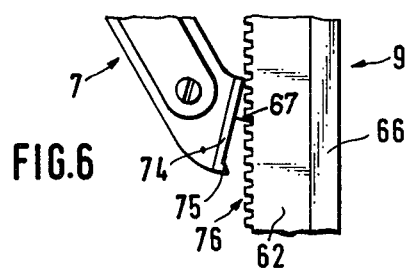

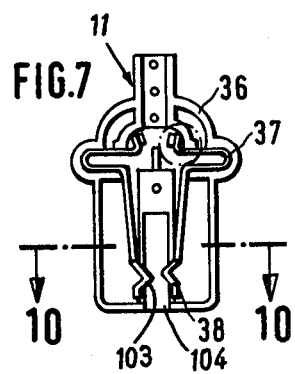
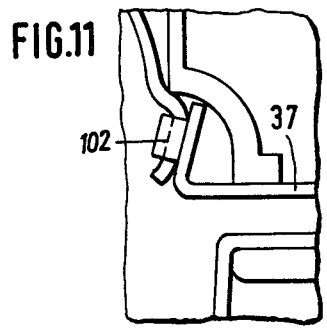
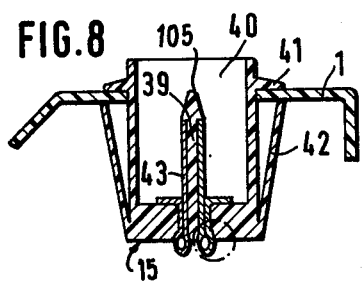
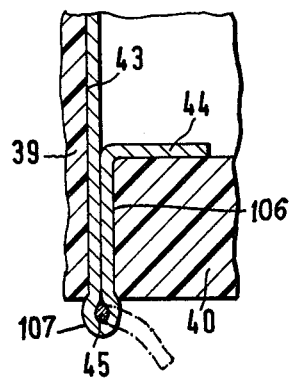
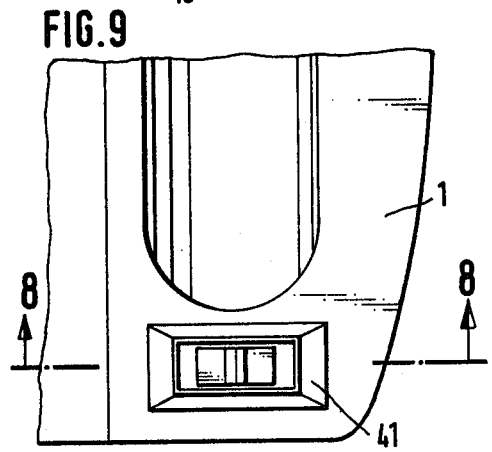
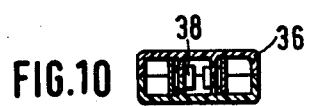

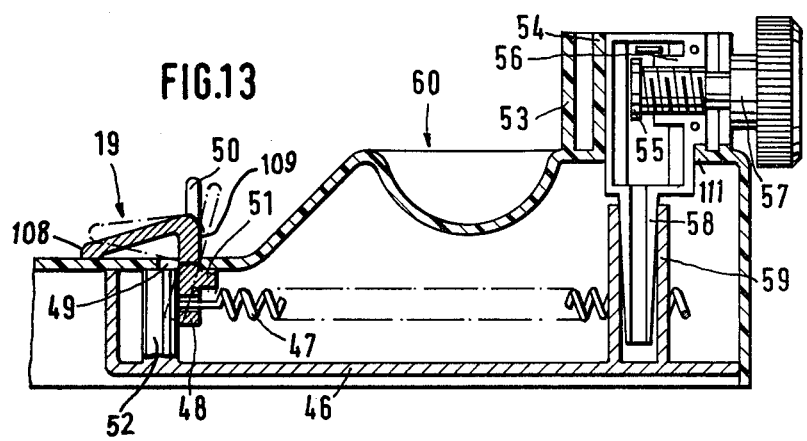
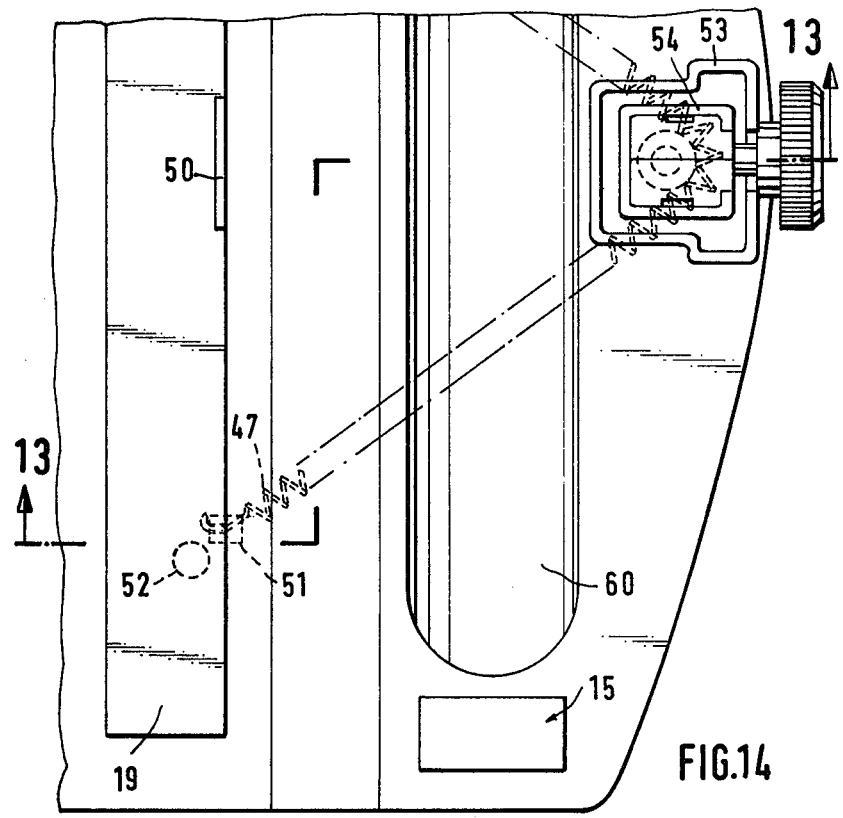

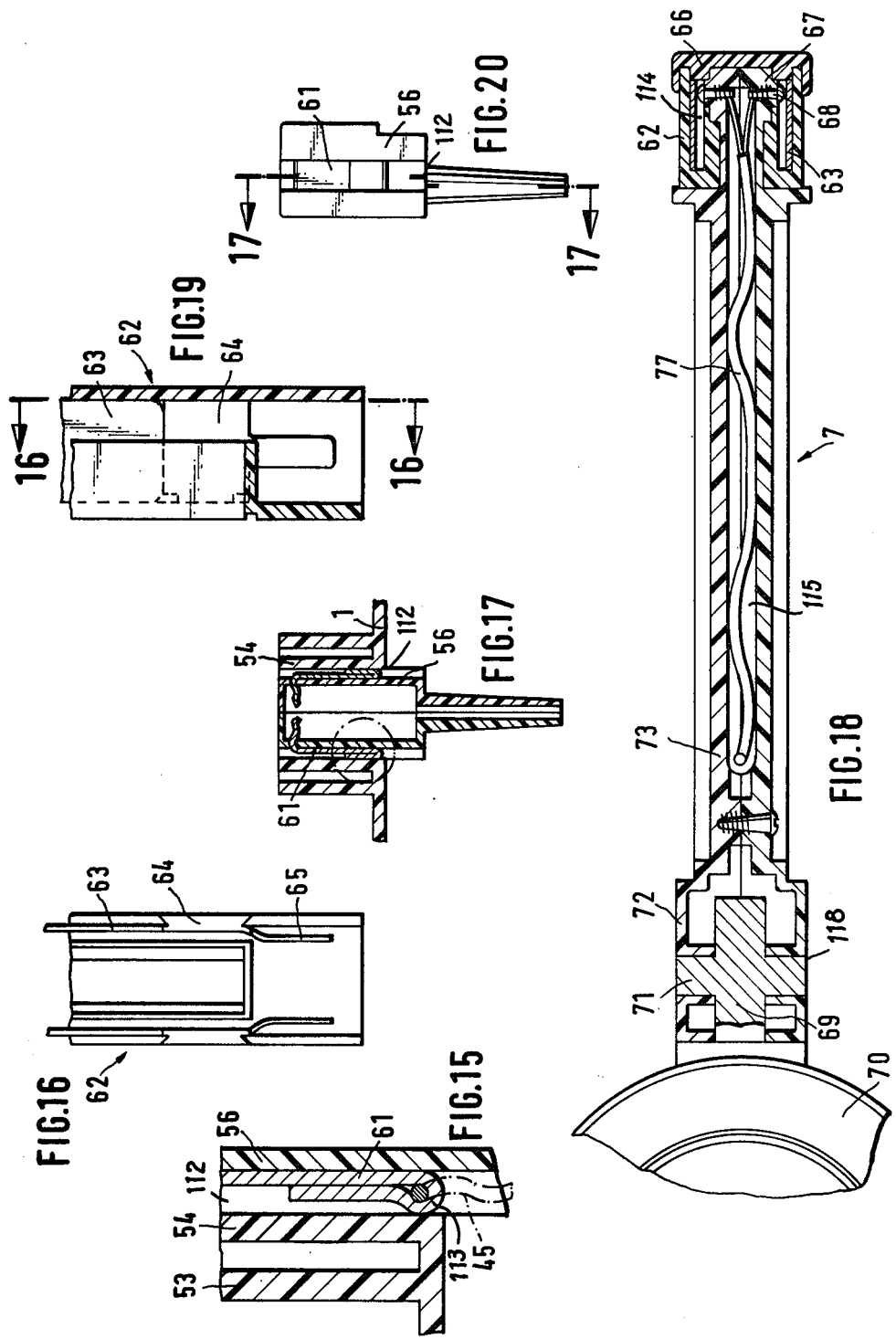

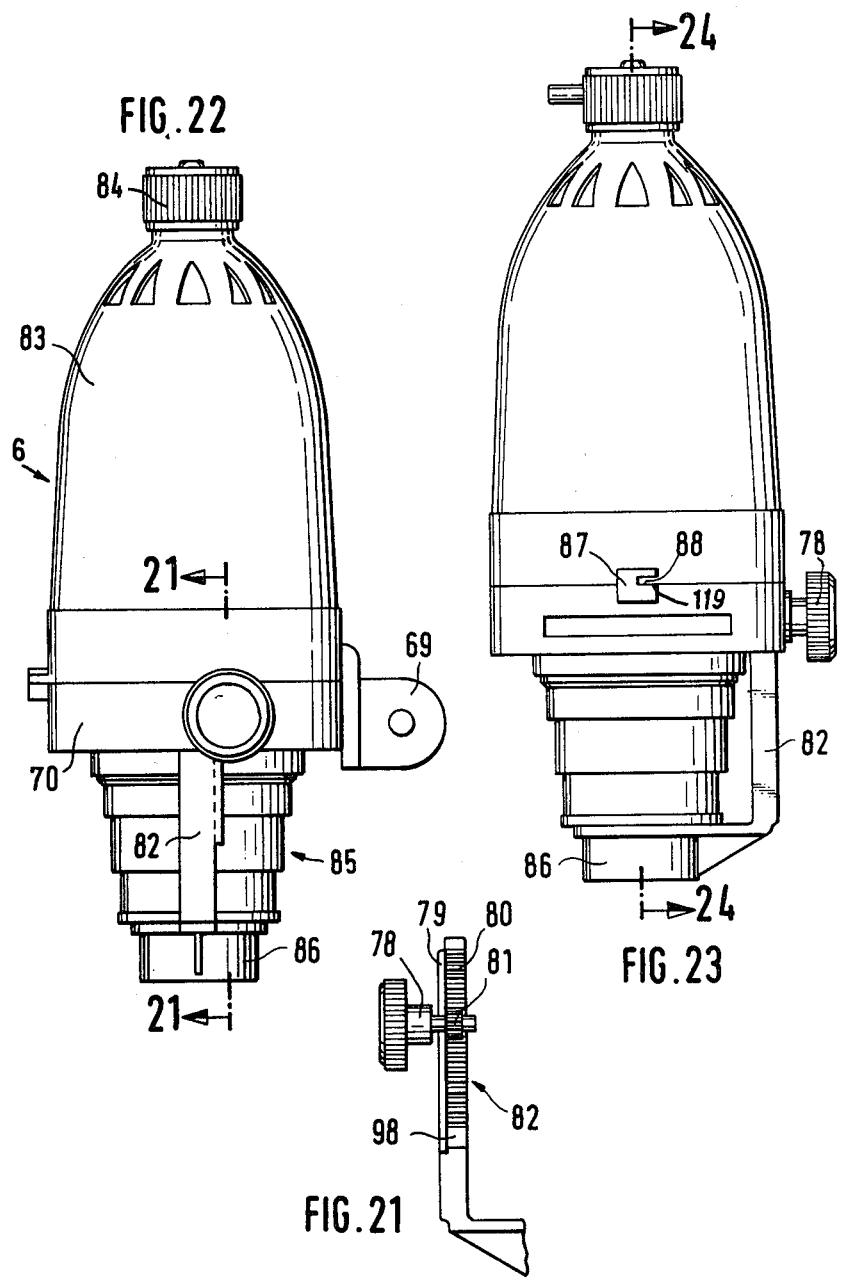

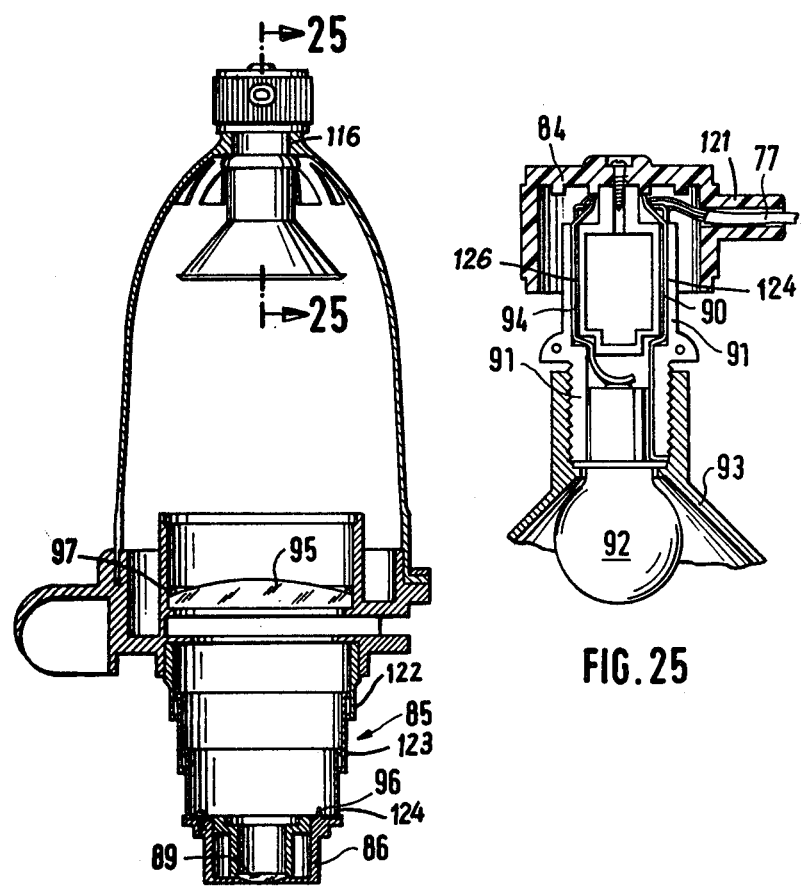

PROJECTOR FOR VISUAL IMAGES

BACKGROUND OF THE INVENTION

This invention relates generally to a projector for visual images. While such projectors have been known in the art, the present device presents an improved approach to multifunctional yet relatively simple and inexpensive portable projectors.

SUMMARY OF THE INVENTION

Generally speaking, in accordance with the invention, a projector for visual images is provided, which is portable and which may be used to project images both horizontally and vertically. The device has a base and means for attaching the projection paper to the base. The projector has a vertical column to which is attached an adjustable arm on which is mounted the projection head. The adjustable arm may be adjusted to any desired height on the vertical column. The device is batterypowered and hence portable. The internal connections of the projector are carried by the components of the projector themselves rather than by separate wiring. The projection head is tiltable and its lens stage is adjustable with respect to it.

Accordingly, it is an object of this invention to provide an improved projector for visual images that is capable of projecting either horizontally or vertically and which may be used to adjust the size of the projected image.

Another object of this invention is to provide an improved projector for visual images which is portable.

A further object of this invention is to provide a projector for visual images in which many of the requisite electrical connections are built into the component parts of the projector.

Still another object of this invention is to provide a projector for visual images that is simple to construct, repair and assemble.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a side elevational view of a preferred embodiment of the instant invention;

FIG. 2 is a sectional view of the battery compartment taken along line 2—2 of FIG. 3;

FIG. 3 is a longitudinal, sectional view of the battery compartment;

FIG. 4 is a sectional view along line 4—4 of FIG. 3;

FIG. 5 is a top plan view of the battery compartment with its lid removed;

FIG. 6 is a partial elevational view of the manner of securing the supporting arm to the column at a desired height;

FIG. 7 shows one of the symmetrical halves making up the male electric plug member;

FIG. 8 is a partial sectional view of a female electric socket member taken along line 8—8 of FIG. 9, illustrating the position of the electric socket member in relation to the electric plug member of FIG. 7 which mates with it;

FIG. 9 is a partial top plan view of the base platform;

FIG. 10 is a sectional view taken along line 10—10 of FIG. 7;

FIG. 11 is an enlarged view of a detail of the plug member shown in FIG. 7;

FIG. 12 is an enlarged view of a detail of the receptacle member shown in FIG. 8;

FIG. 13 is a partial sectional view taken along line 13—13 of FIG. 14;

FIG. 14 is a partial top plan view of the base platform with the vertical column removed;

FIG. 15 is an enlarged view of a detail of the connection plug shown in FIG. 17;

FIG. 16 is a sectional view of the column taken along line 16—16 of FIG. 19;

FIG. 17 is a sectional view of the connection plug taken along 17—17 of FIG. 20;

FIG. 18 is a partial sectional view taken along lines 18—18 of FIG. 1;

FIG. 19 is a partial longitudinal sectional view of the vertical column;

FIG. 20 is a side elevation of the connection plug;

FIG. 21 is a partial sectional view taken along line 21—21 of FIG. 22;

FIG. 22 is a side elevation of the projector housing;

FIG. 23 is a front elevation of the projector housing;

FIG. 24 is a sectional view taken along line 24—24 of FIG. 23; and

FIG. 25 is an enlarged sectional view taken along line 25—25 of FIG. 24.

DESCRIPTION OF THE PREFERRED EMBODIMENTS

The present invention is concerned with a projector for visual images, and as shown in FIG. 1 it is comprised of a base platform 1 having an upright column 9 to which an adjustable arm 7 is slidingly attached to support a projector housing 6, the latter being provided with a suitable opening 101 for guided entry of a small frame 3 which holds a photographic transparency 5. Base platform 1 is fitted with an electric plug member 15, arranged to mate with a further electric plug member 11 which, by means of suitable conductors 23, is joined to a battery compartment 14.

Battery compartment 14 is comprised of a parallelepiped shaped body 20 fitted with a lid 22, and, as may be seen from FIGS. 2-5, the sides of both the body and the lid terminate in the shape of half-sleeves 34 and 31 respectively, which together comprise two ducts for the conductor cables. Rings 32 are provided for overfitting sleeves 31, 34 to firmly join lid 22 and body 20 in closed condition. A flexible connector 33 may be provided to avoid loss of ring 32 when not in use.

Each of the shorter sides of body 20 has a holder 30 mounted to its interior. Holders 30 have conductive strips 27, 27' which have a flat rectangular portion and a second rectangular portion having a triangular cut-out 28 for holding helical springs 29.

The narrow bridge joining the two rectangular portions of strip 27 is cut and shaped so as to form slots 26 for housing and gripping the ends of conductor cables 23. As shown in FIGS. 2, 4 and 5, the rectangular portions belonging to a strip 27 are separated from each other by means of a suitable cut in the bridge between them, while those belonging to the other strip 27' remain joined together, thus enabling batteries 35, as illustrated with dotted lines in FIG. 3, to be suitably inserted in series.

As shown in FIGS. 7 and 10, the electric plug member 11 connected to battery compartment 14 through conductors 23 is comprised of two body-halves 36 made from plastic insulating material, each body half 36 having a respective and identical conductive strip 37. Each conductive strip 37 has a ring 102 mounted to one of its ends for housing and gripping an end of conductor cables 23 (See FIG. 11) while at the opposite end there is an angular fold 38 which protrudes through a window 103 in a guide socket 104 formed between body-halves 36.

Electric socket member 15 as shown in FIGS. 8 and 9, is comprised of a body 40 whose shape is generally a hollow parallelepiped made from plastic material, having an upper rim 41 around its edge, which acts as a stop upon its being inserted into base 1, and having moreover two small feet 42 on the sides, of a somewhat flexible nature. When body 40 is being fitted onto base 1, feet 42 fold resiliently against the sides of body 40, and after fitting is completed, they open out and abut against the bottom face of base 1, thus preventing electric socket member 15 from being accidentally withdrawn. Body 40 of electric socket member 15 comprises a central blade 39 in line with guide socket 104 formed between body-halves 36 of electric plug member 11.

Blade 39 is provided on each of its sides with connection strips 43 and its end 105 is pointed in shape in order to separate and engage connection strips 37 on electric plug member 11, and thus achieve an instantaneous contact between connection strips 38 and connection strips 43. The assembly of connection strips 43 is carried out in the following manner: Each one of them is bent about itself, as a hairpin is, and it is fitted through a lower opening 106 in body 40. The lowermost end 107 of strip 43 is ring shaped for gripping a respective conductor cable 45, and as shown in FIG. 12, the end 44 of strip 43 is bent, thus firmly securing it in its operative position.

A paper-holding bar 19 is provided on base 1, as shown in FIGS. 1, 13 and 14. Paper-holding bar 19 has a lip 108 which may be used to overlie a piece of paper placed on base 1. Paper-holding bar 19 is mounted to base 1 through holes 49 provided in base 1. The rear edge 109 of paper-holder 19 has a downward extending pin 48 extending through hole 49. An elbow-piece 51 also extending from edge 109 abuts the underside of base 1. Attached below elbowpiece 51 is a spring 47 which pulls pin 48 rearwardly and thereby biases edge 108 downwardly against paper positioned on base 1. Mounted to the underside of base 1 is a lower cover 46 having a sleeve 59 around which spring 47 loops. After looping around sleeve 59 the other end of spring 47 is connected as described above to the other side of paper-holding bar 19. Extending upwardly from paper-holding bar 19 at its midpoint is a handle 50 for moving edge 108 upwardly so that a paper may be inserted under it, as shown by the dotted lines of FIG. 13. In order to prevent accidental release of paper-holding bar 19, lower cover 46 has extensions 52 abutting pin 48 of paper-holding bar 19.

Also mounted on base 1, to the rear of paper-holding bar 19 is a trough 60 for holding pencils or other drafting instruments. Adjacent trough 60 on base 1 is plug unit 15. Centrally mounted, to the rear of trough 60 on base 1 is an inner sleeve 54. Base 1 has an opening 111, the periphery of which is surrounded by inner sleeve 54. Inner sleeve 54 is surrounded by an outer sleeve 53, a connection plug 56 is mounted inside inner sleeve 54. The lower portion 58 of connection plug 56 forms an elongated inverted truncated cone which is inserted in sleeve 59 of lower cover 56. As shown in FIGS. 15, 17 and 20, each side of connection plug 56 has a groove 112 into which a conductive strip 61 is inserted, the upper half of conductive strip 61 extends inwardly through connection plug 56 and the lower end has a loop 113 to which is connected conductor 45 leading from socket 15.

The upper portion of connection plug 56 has a spiral thread (not shown) which extends rearwardly through outer sleeve 53. A tightening knob 57 is screwed onto the spiral thread at the rear of base 1 and an inner enlarged rim 55 prevents the complete removal of tightening knob 57. Thus column 9 may be mounted to base 1 by its insertion between outer sleeve 53 and inner sleeve 54. When column 9 is so inserted, it may be secured in place by tightening knob 57.

As shown in FIGS. 16, 18 and 20, column 9 is constructed of a rear plate 66 and a pair of side plates 62 having an interior slot 114. A conductive plate 63 is mounted in slot 114 and extends along the entire length of column 9. The lower portion 64, shown in FIG. 16 of conductive plate 63 has a pair of inwardly extending feet 65 which will be inserted in groove 112 of connection plug 56 and thereby contact conductive strips 61 which as before noted, are conductively connected to plug 15.

Adjustable arm 7 is comprised of two opposed body halves 73 which are bolted together and which define a channel 115 through which a pair of wires 77 extend. The rear portion of arm 7 rides within the channel defined by rear section 66 and side plates 62 of column 9. The rear portion of column 7 has a pair of screws 68 which contact conductive plates 63 of column 9. Wires 77 are attached to screws 68 and lead to projection lamp housing 6. Thus, current supplied by batteries 35 flows through conductors 23 into electric plug 11 which, when inserted into socket 15 mounted on base 1, is carried to connection plug 56 through conductors 45. The current in turn is conducted through conductive plates 63 which are contacted by screws 68 which are connected to projection bulb 92 mounted in projection lamp housing 6, through wires 77.

Side plates 62 in assembled condition allow for spreading deflection thereof to permit insertion of the end 67 of arm 7 for attaining the assembled conduction shown in FIG. 18. In view of the T-shaped configuration of rearward portion 67, arm 7 is rotated 90° about its longitudinal axis prior to insertion.

The mechanism for adjusting the height of adjustable arm 7 along column 9 is shown in FIG. 6. Rearward portion 67 (FIGS. 6 and 18) of adjustable arm 7 is pivotally mounted in column 9. A vertical surface 74 provided at the end of body halves 73 has a tooth 75 at its bottom edge which will engage a toothed rack 76 provided along the forward surface of column 9. Thus, in order to adjust the height of adjustable arm 7 along column 9, adjustable arm 7 is pivoted so that tooth 75 is disengaged from rack 76 which allows rearward portion 67 to be slid up and down column 9. When the desired height is achieved, tooth 75 is re-engaged with rack 76. Conductive screws 68 are maintained in engagement with conductive plates 63.

Referring now to FIGS. 18 and 21-25, projection housing 6 is pivotally mounted to the forward end of adjustable arm 7. Projection lamp housing 6 has a supporting frame 70 from which a lug 69 extends. A round pin 71 extends from each side of lug 69. The forward portion 72 of adjustable arm 7 has a circular opening 118 on each side of forward portion 72 through which pin 71 extends. Thus, as shown by the dotted lines in FIG. 1, projection lamp housing 6 may be horizontally tilted in order to project an image onto a wall.

Projector housing 6 is essentially comprised of a conoidal shaped body 83, which is attached to supporting frame 70 and fitted with a telescoping arrangement 85 to allow a lens 89 to be selectively adjusted for focus. The assembly between conoidal shaped body 83 and supporting frame 70 is achieved by slidable fit of the former onto the latter, whereupon body 83 is rotated so that a tooth 88 on body 83 engages a slot 119 provided on a protrusion 87 which forms part of supporting frame 70 (see FIG. 23).

The top of conoidal shaped body 83 is provided with an opening 116 for accommodating two plastic body-halves 91 which, as shown in FIG. 25, are coupled together by a screw fastened cover 84. Wires 77 are inserted through a hole 121 in cover 84 and their ends are gripped respectively in the gaps 125, 126 provided by strips 90 and 94, which are held between body-halves 91 which have suitable grooves for accommodating them. A spiral thread (not shown) surrounds the outside of the assembly comprising the body-halves 91, upon which a reflector 93 is screwed, and the bayonet base of a bulb 92 is inserted with a press fit between reflector 93 and body-halves 91, and in this way is held securely for operation, and suitably positioned with respect to strips 90 and 94.

Supporting frame 70 is provided with a condensing lens 95, which is secured in position by means of a circular spring 97. Surrounding frame 70 also carries the aforementioned telescoping arrangement 85 which is comprised of a set of concentric ringshaped pieces 122, 123, 124 of which the uppermost 122 is attached to supporting frame 70, and the lowermost 124 is attached by means of pins 96 and suitable threaded bolts, to the cover cap 86, with lens 89 being held between the two parts thereof, (see FIG. 24). Cover cap 86 is arranged in attachment with a plunger arm 82 which extends up and through a hole provided for this purpose in supporting frame 70. On one face of arm 82 is a toothed rack 80 with which a cog wheel 81 meshes, and cog wheel 81 is turned by rotation of adjustment knob 78 to which it is attached. In this manner, upon rotating knob 78 in either direction, plunger arm 82 is displaced longitudinally upwards or downwards, and hence telescoping arrangment 85 is made either to extend or withdraw, and so allow lens 89 to be selectively positioned for height, thus enabling the focus of the projected image to be altered (see FIGS. 21 and 23). Plunger arm 82 is provided along the length of its toothed portion with a rim 79 which prevents knob 78 from being pulled outwards once assembled. The upward position of telescoping arrangement 85 is defined by the stop 98 provided on plunger arm 82 at the end of the row of teeth in rack 80 when cog wheel 81 contacts it. The outermost extended position of telescoping arrangement 85 is defined by members 122, 123, 124 themselves, thus preventing the plunger arm 82 from becoming disengaged from cog wheel 81.

It is to be understood that the instant invention is not limited to projection of transparency's used by draftsmen and the like. The invention may also be used as a photographic enlarger with a negative inserted in frame 3 and a piece of photographic paper mounted to base 1.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A projector for visual images comprising a base, a column connected to said base, an adjustable arm positionable along said column and a projector body carried by said arm, said column having the general configuration of a channel, with the legs of said channel being resiliently spreadable, the end of said arm joining with said column including connection means for engagement within the channel of said column, said connection means being positionable within said column upon rotation of said connection means 90°, said connection means being rotatable after insertion 90° to return to its original position, said resiliency of said legs serving at least in part to locate said arm, a first annular member extending upwardly from said base and a second annular member surrounding said first annular member and defining a space between said first and second annular members, said column being insertable in said space for supporting said column on said base, clamping means acting between said annular members and said column for securing said column with respect to said base, conductor means mounted internally of said first annular member, and said column including conductive plates engaged with said conductor means when said column is mounted to said base.

2. A projector for visual images as claimed in claim 1 and further including a socket mounted on said base, conductors electrically connecting said socket to said conductor means and a plug removably mounted in said socket, said plug being connectable to a power source.

3. A projector for visual images as claimed in claim 2 wherein said socket comprises an open receptacle, a blade mounted in said receptacle, said blade having a pair of discrete conductive elements mounted along its outer periphery and said plug comprises a receptacle for said blade of said socket, a pair of contacts disposed in said plug for engaging said discrete conductive elements of said socket, said contacts of said plug being electrically connectable to a power source.

4. A projector for visual images comprising a base, a column connected to said base, an adjustable arm positionable along said column and a projector body carried by said arm, said column having the general configuration of a channel, with the legs of said channel being resiliently spreadable, the end of said arm joining with said column including connection means for engagement within the channel of said column, said connection means being positionable within said column upon rotation of said connection means 90°, said connection means being rotatable after insertion 90° to return to its original position, said resiliency of said legs serving at least in part to locate said arm, said column being provided with a plurality of longitudinally extending rack teeth and said end of said arm includes a pivot portion located within said channel of said column and a tooth portion engageable with said rack teeth, said tooth portion being located vertically below said pivot portion when said projector is in use, the weight of said projector body normally pivots said tooth portion into engagement with a selected one of said rack teeth to maintain said projector body in a preselected vertical position and said projector body is rotatable about said pivot portion to disengage said tooth portion from the rack teeth to permit vertical sliding adjustment of said projector body along said column.

* * * * *